United States Patent
Shih

(10) Patent No.: US 7,773,307 B2
(45) Date of Patent: Aug. 10, 2010

(54) PHASE MASK WITH CONTINUOUS AZIMUTHAL VARIATION FOR A CORONAGRAPH IMAGING SYSTEM

(75) Inventor: Chun-Ching Shih, Palos Verdes Estates, CA (US)

(73) Assignee: Northrop Grumman Space & Mission Systems Corporation, Los Angeles, CA (US)

( * ) Notice: Subject to any disclaimer, the term of this patent is extended or adjusted under 35 U.S.C. 154(b) by 745 days.

(21) Appl. No.: 11/637,288

(22) Filed: Dec. 12, 2006

(65) Prior Publication Data

US 2008/0137171 A1    Jun. 12, 2008

(51) Int. Cl.
   *G02B 13/08* (2006.01)
(52) U.S. Cl. .............. 359/668; 359/669; 400/5
(58) Field of Classification Search .......... 359/668, 359/669, 670; 430/5, 322
   See application file for complete search history.

(56) References Cited

U.S. PATENT DOCUMENTS

| | | | |
|---|---|---|---|
| 3,020,395 A * | 2/1962 | Peltz | 362/330 |
| 4,923,293 A | 5/1990 | Nelles et al. | |
| 5,249,080 A | 9/1993 | Watson et al. | |
| 5,291,333 A | 3/1994 | Mills et al. | |
| 5,450,352 A | 9/1995 | Ftaclas et al. | |
| 5,898,529 A | 4/1999 | Meyer et al. | |
| 6,344,298 B1 * | 2/2002 | Starodubov et al. | 430/5 |
| 6,545,808 B1 * | 4/2003 | Ehbets et al. | 359/566 |
| 2003/0008218 A1 * | 1/2003 | Friedrich et al. | 430/5 |
| 2004/0004125 A1 * | 1/2004 | Havens et al. | 235/462.22 |
| 2004/0156087 A1 | 8/2004 | Oppenheimer et al. | |
| 2004/0264858 A1 * | 12/2004 | Rothenberg | 385/37 |

FOREIGN PATENT DOCUMENTS

GB    2389669    * 12/2003

OTHER PUBLICATIONS

Mawet, et al.: "Annular Groove Phase Mask Coronagraph"; The Astrophysical Journal, Nov. 10, 2005/vol. 633, pp. 1191-1200.
Foo, et al.: "Optical Vortex Coronagraph"; Optics Letters, vol. 30, No. 24, Dec. 15, 2005, pp. 3308-3310.

* cited by examiner

*Primary Examiner*—Timothy J Thompson
(74) *Attorney, Agent, or Firm*—Tarolli, Sundheim, Covell & Tummino LLP

(57) ABSTRACT

Systems and methods for shifting the phase of incident light to induce a continuous phase variation in an azimuthal direction. A phase mask assembly has a first surface and a second surface. The first surface and the second surface are configured such that the distance between the first surface and the second surface varies continuously in an azimuthal direction around the phase mask. This mask can be used in a coronagraph system to effectively suppress the on-axis star image for the detection of off-axis planets.

10 Claims, 2 Drawing Sheets

PHASE MASK WITH CONTINUOUS AZIMUTHAL VARIATION FOR A CORONAGRAPH IMAGING SYSTEM

TECHNICAL FIELD

The present invention relates generally to optical technology, and more particularly to a phase mask that utilizes a continuous phase variation in an azimuthal direction for use in a coronagraph imaging system.

BACKGROUND OF THE INVENTION

Detecting planets outside of the solar system is frequently complicated by the relative proximity of extrasolar planets to the stars they orbit. Since planets can be located only by the reflected light of their star, the star will be significantly brighter than the planet of interest, in some cases on the order of ten million times brighter. In light of the relative proximity of a planet to its star, it is necessary to attenuate the light of the star to obtain a useful image of the planet. In general, this has been accomplished through the use of coronagraphs. The design of coronagraphs can vary, including simple coronagraphs that utilize an occulting disk to block the star's light and nulling coronagraphs that use a phase mask to shift the phase of light, as opposed to directly blocking it. An occulting disk is usually used to block the sun and retrieve corona images. However, it is more suitable to use a phase mask for star systems because the entrance aperture dominates the diffraction effect of images.

SUMMARY OF THE INVENTION

In accordance with an aspect of the present invention, a phase mask assembly is provided. The phase mask assembly has a first surface and a second surface. The first surface and the second surface are configured such that the distance between the first surface and the second surface varies continuously in an azimuthal direction around the phase mask.

In accordance with another aspect of the present invention, a coronagraph apparatus is provided for separating a desired off-axis image from an undesired central image having a greater intensity. A first imaging lens receives light representing the desired off-axis image and the undesired central image. A reimaging portion mitigates the undesired central image. The reimaging portion includes a phase mask assembly that applies a continuous phase variation in an azimuthal direction to an image received from the first imaging lens, such that a null intensity region is produced in the center of the received image.

In accordance with yet another aspect of the present invention, a method is provided for producing a phase mask assembly that provides a continuous phase variation to incident light along an azimuthal direction. A desired wavelength is determined. An appropriate width variation is determined for the phase mask assembly according to the desired wavelength, such that the width of the phase mask varies continuously in an azimuthal direction. A transparent material is fabricated to exhibit the determined width variation.

DETAILED DESCRIPTION OF INVENTION

Figure 1:
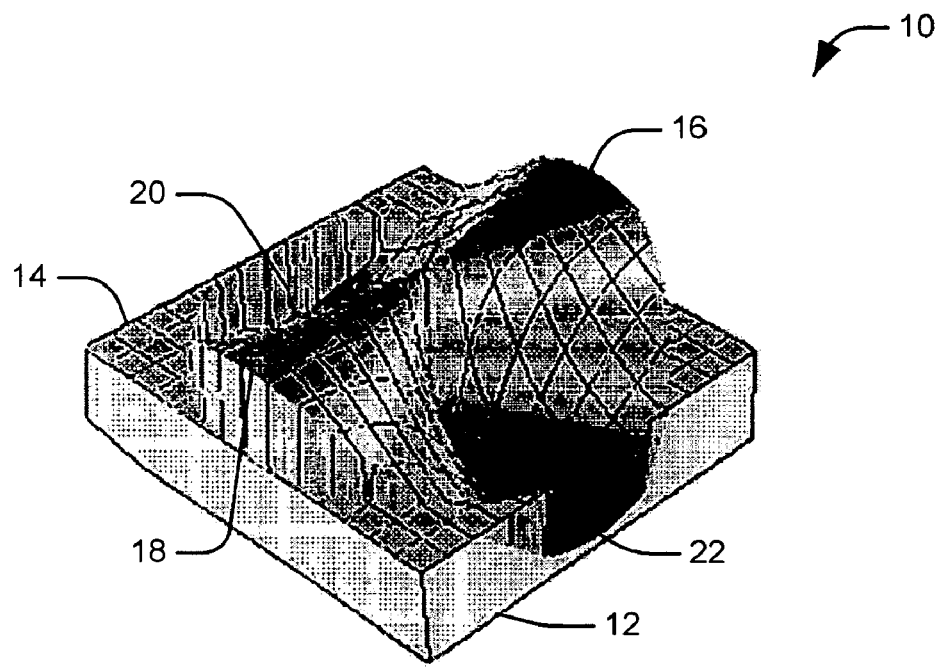
FIG. 1 illustrates a phase mask assembly utilizing a continuous phase variation in an azimuthal direction in accordance with an aspect of the present invention.

FIG. 1 illustrates a phase mask assembly 10 utilizing a continuous phase variation in an azimuthal direction in accordance with an aspect of the present invention. The phase mask assembly 10 can be made of any transparent material having desired refractive properties, such as glass, plastic, or crystal. The assembly can be fabricated from the transparent material, for example, via diamond turning, a precision fabrication process by which computer controlled diamond cutting elements are used to shape a material with a precision of one-hundredth of a micron. The phase mask comprises a first surface 12 that is substantially flat. A second surface 14 is fabricated such that the thickness of the phase mask assembly 10 varies continuously in an azimuthal direction. In other words, if the center of the phase mask assembly is considered to be an origin of a coordinate system, the distance between the first surface 12 and the second surface 14 at any given point varies with the angle between a vector drawn between the point and the origin and an arbitrary axis of the coordinate system.

The illustrated phase mask 10 is operative to change the phase of incident light of a given wavelength of interest continuously in an azimuthal direction. In accordance with an aspect of the present invention, the variation in thickness of the phase mask 10 from its thickest points 16 and 18, referred to as peaks, to its thinnest points 20 and 22, referred to as valleys, can be on the order of one wavelength. In the illustrated example, this variation of thickness is sinusoidal and can be described as $$d(\theta) = d_0 - a \cos(2m\theta) \qquad \text{Eq. 1}$$

where $d_0$ is the average thickness, a is the variation amplitude such that the difference between a peak of the phase mask and a valley of the phase mask is equal to 2a, and m is the variation order. Such phase mask begins at a first peak 16 at a first azimuthal angle, drops to a first valley 20 at an angle ninety degrees from the first peak 16, rises to a second peak 18 at an angle 180 degrees from the first peak, and falls to a second valley 22 at an angle 270 degrees from the first peak before returning to the first peak to complete two full sinusoidal cycles. Since the thickness of the phase mask 10 varies azimuthally, light passing through various portions of the phase mask 10 will be slowed disproportionately, resulting in a continuous variation in phase in the azimuthal direction in light. The phase shifted light will have a null intensity at the center of the mask, but substantially no distortion away from the center of the phase mask, as the continuous phase shift ensures that there will be no phase discontinuity away from the center.

Figure 2:
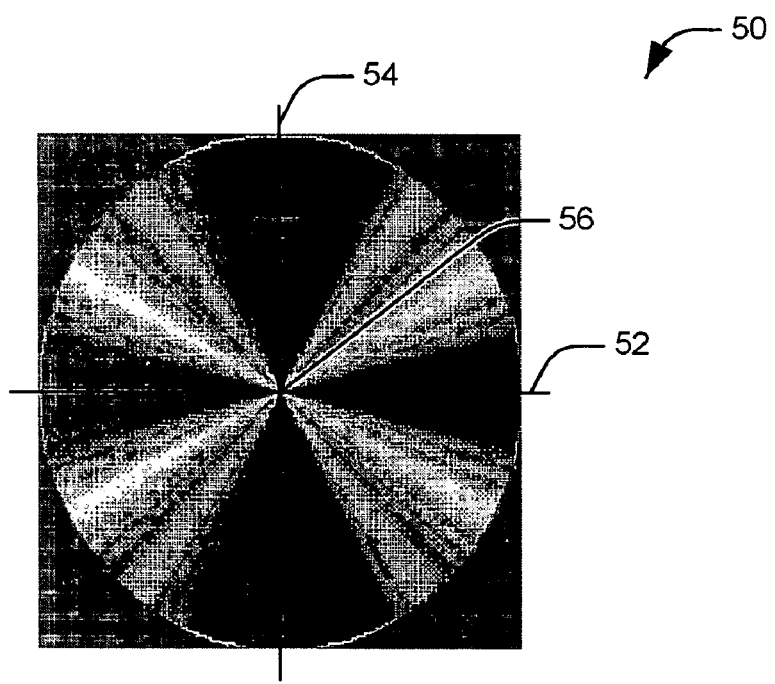
FIG. 2 illustrates an exemplary phase profile for a phase mask in accordance with an aspect of the present invention.

FIG. 2 illustrates an exemplary phase profile 50 for a phase mask in accordance with an aspect of the present invention. The phase profile 50 is illustrated against an arbitrary coordinate axis comprising a horizontal axis 52 and a vertical axis 54 passing through an origin 56 representing the center of the phase mask, It will be appreciated that the coordinate axis is arbitrary, and that the particular orientation of the axes 52 and 54 relative to the phase profile 50 is selected to coincide with a region of maximum width merely to simplify explanation of the phase profile. One skilled in the art will understand that the description provided below can be altered to accommodate any orientation of the axes 52 and 54.

In the illustrated example, the phase profile 50 is sinusoidal to avoid phase singularities in the azimuthal direction away from the origin 56 of the phase profile. Specifically, the illustrated phase profile 50 can be described as:

$$\phi(\theta)=a\cos(2n\theta) \quad \text{Eq. 2}$$

where $\phi(\theta)$ is the phase at a point having an azimuthal coordinate $\theta$, and n is the index of fraction of the material, and $\lambda$ is the wavelength. When m is equal to one, the phase profile 150, and the corresponding width of the phase mask, will vary across two complete cycles in a single circumscription of the phase mask. It will be appreciated that more complex phase profiles can be generated using larger values of m, with the number of cycles associated with a circumscription of the phase mask increasing proportionately, such that four cycles are realized when m is equal to 2 and six cycles are realized when m is equal to three.

In order to have zero on-axis intensity, the phase profile 50 must satisfy the following relationship:

$$\int_{-\pi}^{\pi} e^{i\phi(\theta)}d\theta = \int_{-\pi}^{\pi} e^{ia\cos(2n\theta)}d\theta = 2\pi J_0(a) = 0 \quad \text{Eq. 3}$$

Accordingly, the variation amplitude, a, should be related to the zeros of a Bessel function of the zeroth order. If the refractive index n=1.5 and the first zero is chosen, the variation amplitude a can be found to be $(a/\lambda)=2.405/\pi=0.766$, which is about three-quarter of a wavelength.

Figure 3:
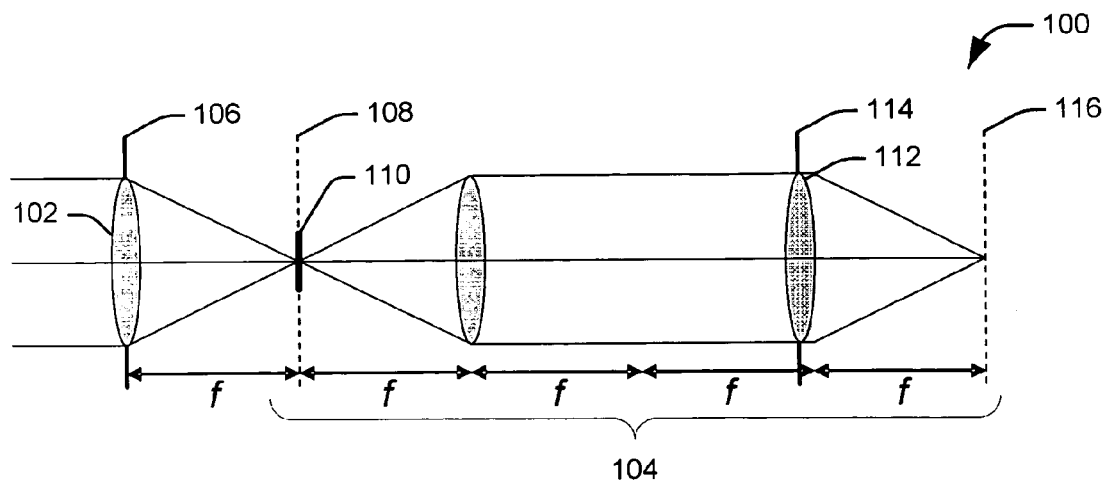
FIG. 3 illustrates a coronagraph utilizing a phase mask comprising a phase mask utilizing a continuous phase variation in an azimuthal direction in accordance with an aspect of the present invention.

FIG. 3 illustrates a coronagraph 100 utilizing a phase mask having a continuous phase variation in an azimuthal direction in accordance with an aspect of the present invention. The illustrated coronagraph 100 consists of a first imaging lens 102 followed by a re-imaging system 104. A first pupil 106 defines an entrance to the coronagraph, and an image associated with the first imaging lens 102 forms at a first focal plane 108. To obtain a corona image at a reimaging plane 116, a phase mask 110 can be placed at the first focal plane 108 to attenuate an undesired central image (e.g., an image of a star) having a greater intensity than the desired image and a second pupil 114 can be placed at a second lens plane 112 to suppress undesirable diffraction. In the typical circumstance, the undesired central image is effectively a point source, and the image at the first focal plane 108 is dominated by an Airy pattern induced by the entrance aperture.

A desired image, generally of a much lower intensity than the undesired central image, can be represented as a displaced secondary Airy pattern at the first focal plane 108. In order to suppress the primary Airy pattern at a reimaging plane 116, the phase mask 110 is placed at the first focal plane 108 to create, in concert with the second pupil 114 at the second lens plane 112, a null intensity on axis at the reimaging plane 116. The phase mask 110 can comprise a transparent material that is configured such that the phase of light passing through the phase mask is phase shifted azimuthally. For example, the thickness of the phase mask 110 can vary continuously in the azimuthal direction to apply the desired phase shift. As a result, the on-axis (e.g., central) intensity of the image, and accordingly, the majority of the primary Airy pattern, can be suppressed at the reimaging plane 116.

Figure 4:
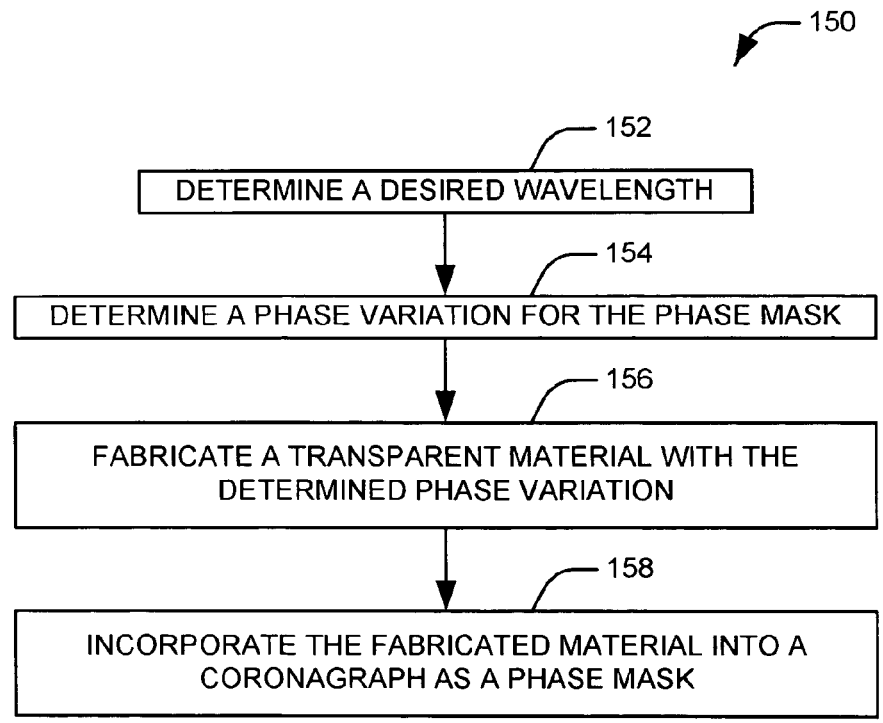
FIG. 4 illustrates a methodology for producing a phase mask assembly that provides a continuous phase variation to incident light along an azimuthal direction

FIG. 4 illustrates a methodology 150 for producing a phase mask assembly that provides a continuous phase variation to incident light along an azimuthal direction in accordance with an aspect of the present invention. At 152, a wavelength of interest is determined. A phase mask in accordance with an aspect of the present invention is most effective when applied to a specific region around an associated wavelength, and efficient use of the phase mask is best achieved by selecting the associated wavelength to coincide with known spectral properties of an object to be viewed.

At 154, an appropriate width variation for the phase mask assembly is determined according to the desired wavelength. In accordance with an aspect of the present invention, the width of the phase mask will be fabricated to vary sinusoidally in an azimuthal direction. According, a phase shift applied to an image subjected to the phase mask such that the image will vary in phase continuously in an azimuthal direction. The amplitude of this sinusoidal variation can be determined, for example, as a zero associated with a zeroth order Bessel function. In accordance with an aspect of the present invention, this amplitude is close to three-quarters of the wavelength of interest, such that the difference in width between the widest portion of the phase mask and the narrowest portion of the phase mask will be approximately equal to one and one-half wavelength.

At 156, a transparent material is fabricated to the determined width variation. This can be accomplished, for example, via a diamond turning process using computer numerical controlled lathes to fabricate the transparent material into a shape having the determined width variation. At 158, the fabricated phase mask can be incorporated into a coronagraph intended for viewing an image having spectral properties associated with the wavelength of interest.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having described the invention, the following is claimed:

1. A phase mask assembly comprising:
   a first surface that is substantially flat; and
   a second surface;
   wherein the first surface and the second surface are configured such that a distance between the first surface and the second surface varies continuously in an azimuthal direction around the phase mask across the entirety of the phase mask, such that when light passes from the first surface to the second surface, the intensity of the light leaving the second surface of the phase mask at a center of the phase mask is substantially attenuated.

2. The assembly of claim 1, wherein the distance between the first surface and the second surface varies sinusoidally in an azimuthal direction across the phase mask assembly.

3. The assembly of claim 1, wherein the distance between the first surface and the second surface at a given azimuthal angle is equal to the product of a variation amplitude and the cosine of an integer multiple of the angle.

4. The assembly of claim 3, wherein the variation amplitude can be determined as the solution to a zeroth order Bessel function.

5. The assembly of claim 3, wherein the integer multiple is two, such that the distance between the first surface and the second function varies over two full cycles in one circumscription of the phase mask.

6. The assembly of claim 3, wherein the integer multiple is four, such that the distance between the first surface and the second function varies over four full cycles in one circumscription of the phase mask.

7. A method for producing a phase mask assembly that provides a continuous phase variation to incident light along an azimuthal direction, comprising:
   determining a desired wavelength;
   determining an appropriate width variation for the phase mask assembly according to the desired wavelength, such that the width of the phase mask varies continuously in an azimuthal direction; and
   fabricating a transparent material to the determined width variation, such that a first surface of the phase mask assembly is substantially flat and a distance between the first surface and a second surface of the phase mask varies continuously in an azimuthal direction around the phase mask across the entirety of the phase mask, such that when light passes from the first surface to the second surface, the intensity of the light leaving the second surface of the phase mask at a center of the phase mask is substantially attenuated.

8. The method of claim 7, wherein shaping a transparent material to the determined width variation comprises fabricating the transparent material via diamond turning.

9. The method of claim 7, wherein determining an appropriate width variation for the phase mask assembly according to the desired wavelength, comprises calculating a variation amplitude representing a range of the determined width variation for the for the phase mask assembly as the zeroes of a zeroth order Bessel function.

10. A phase mask assembly, having an associated wavelength of interest, comprising:
    a first surface; and
    a second surface;
    wherein the first surface and the second surface are configured such that a distance between the first surface and the second surface varies continuously in an azimuthal direction around the phase mask, such that the distance between the first surface and the second surface at a given azimuthal angle is equal to the product of a variation amplitude, substantially equal to one-half the associated wavelength of interest, and a sinusoidal function of an integer multiple of the angle.

* * * * *